United States Patent
Lee

(10) Patent No.: US 10,693,395 B2
(45) Date of Patent: Jun. 23, 2020

(54) APPARATUS AND METHOD OF COMPENSATING FOR STEERING TORQUE OF DRIVING MOTOR

(71) Applicant: MANDO CORPORATION, Gyeonggi-do (KR)

(72) Inventor: Jong Hoon Lee, Incheon (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/264,675

(22) Filed: Jan. 31, 2019

(65) Prior Publication Data

US 2019/0245463 A1 Aug. 8, 2019

(30) Foreign Application Priority Data

Feb. 2, 2018 (KR) .......................... 10-2018-0013251

(51) Int. Cl.
| | |
|---|---|
| *H02K 29/06* | (2006.01) |
| *H02P 6/10* | (2006.01) |
| *B62D 15/02* | (2006.01) |
| *B62D 5/04* | (2006.01) |

(52) U.S. Cl.
CPC ................ *H02P 6/10* (2013.01); *B62D 5/046* (2013.01); *B62D 5/0463* (2013.01); *B62D 15/021* (2013.01)

(58) Field of Classification Search
CPC .................................. H02P 6/10; B62D 5/046

USPC ...................................... 318/400.23, 400.02
See application file for complete search history.

(56) References Cited

U.S. PATENT DOCUMENTS

| | | | |
|---|---|---|---|
| 2009/0009127 A1* | 1/2009 | Imamura | G05B 13/025 318/601 |
| 2013/0099707 A1* | 4/2013 | Okubo | H02P 6/10 318/400.23 |
| 2015/0318808 A1* | 11/2015 | Okubo | H02K 29/03 318/400.02 |
| 2018/0091080 A1* | 3/2018 | Sumasu | H02P 21/16 |
| 2018/0170422 A1* | 6/2018 | Yoshida | B62D 5/046 |
| 2018/0241334 A1* | 8/2018 | Kobayashi | H02P 21/05 |
| 2019/0158004 A1* | 5/2019 | Pramod | H02P 21/05 |

* cited by examiner

*Primary Examiner* — Erick D Glass

(74) *Attorney, Agent, or Firm* — Ladas & Parry, LLP

(57) ABSTRACT

The disclosure provides an apparatus and method of compensating for a torque of a motor. The apparatus includes a torque information collector configured to collect steering information, motor position information, and predetermined motor information, a torque ripple calculator configured to determine a target torque based on the steering information and to determine a compensation torque for torque ripple based on the target torque and the motor information, a compensation current calculator configured to determine a compensation current value based on the motor information and the compensation torque, a current value generator configured to convert the target torque into a target current value and to generate an output current value based on the target current value and the compensation current value, and a current signal output configured to output a current control signal corresponding to the output current value.

11 Claims, 4 Drawing Sheets

APPARATUS AND METHOD OF COMPENSATING FOR STEERING TORQUE OF DRIVING MOTOR

CROSS REFERENCE TO RELATED APPLICATION

This application claims priority from Korean Patent Application No. 10-2018-0013251, filed on Feb. 2, 2018, which is hereby incorporated by reference for all purposes as if fully set forth herein.

BACKGROUND OF THE INVENTION

1. Field of the Invention

The disclosure relates to an apparatus and method of compensating for a torque of a motor provided in an electric power steering (EPS) system of a vehicle and, more particularly to, an apparatus and method of compensating for a torque by calculating a current value for torque ripple based on predetermined motor information.

2. Description of the Prior Art

A steering system is a device that allows a driver to turn a steering wheel to adjust the advancing direction of a vehicle. If the front wheel of the vehicle turns, the steering system arbitrarily changes the center of rotation to help the driver to advance the vehicle in a desired direction. This steering system is supplemented with a power assist steering system to relieve the driver's power, and an electric power steering (EPS) system is mainly used.

In the above-mentioned EPS, a three-phase brushless AC motor is used as an actuator in order to ensure reliability. Here, the AC motor does not always output a torque output uniformly as a constant value, but outputs the torque output as torque ripple having a predetermined waveform shape.

The torque ripple of the AC motor greatly affects noise, vibration, and harshness which are performance indicators of the EPS, and may cause a driver to feel the steering heterogeneity at the time of steering operation. Thus, a method of removing the torque ripple by adding a separate device for removing the torque ripple is being studied.

For example, as a method of reducing a low-frequency torque ripple generated by a mechanical element, there has been disclosed a method of reducing mechanical vibration caused by the torque ripple of a motor by using a soft material such as rubber as a coupling between the motor and a reduction gear.

However, such a method has a problem in that it has no significant effect in reducing an extremely low-frequency torque ripple caused if a driver steers the steering wheel at a very low speed or due to other factors.

In order to solve this problem, there has been proposed a method in which torque ripple may be reduced in such a manner to cancel the torque ripple by artificially generating a torque that is an antiphase of the torque ripple without adding a mechanical device, thereby reducing the steering heterogeneity.

However, the torque ripple of the motor is somewhat different due to the dispersion of the motor and outputs a non-uniform waveform, but the antiphase torque is an artificially generated torque and always outputs a constant waveform, so the actually canceled waveform is not a constant waveform but a little fluctuation remains. That is, even if the torque ripple is canceled by the antiphase torque, there is a problem that the steering heterogeneity is generated due to the residual torque fluctuation.

In addition, this method requires a further installation of a sensor for sensing torque ripple or a program such as a lookup table or map for calculating an antiphase torque corresponding to the torque ripple, so that the manufacturing cost increases and the burden of the arithmetic processing increases.

SUMMARY OF THE INVENTION

In this background, an aspect of the disclosure is to provide an apparatus and method of compensating for a torque of a motor provided in an electric power steering (EPS) system of a vehicle.

Another aspect of the disclosure is to provide an apparatus and method of compensating for a torque by calculating a current value for torque ripple based on predetermined motor information and sensing information without adding a separate device.

The problems to be solved by the disclosure are not limited to the above-mentioned problems, and other problems not mentioned can be clearly understood by those skilled in the art from the following description.

In accordance with an aspect of the disclosure, an apparatus for compensating for a torque of a motor may include: a torque information collector configured to collect steering information, motor position information, and predetermined motor information; a torque ripple calculator configured to determine a target torque based on the steering information and to determine a compensation torque for torque ripple based on the target torque and the motor information; a compensation current calculator configured to determine a compensation current value based on the motor information and the compensation torque; a current value generator configured to convert the target torque into a target current value and to generate an output current value based on the target current value and the compensation current value; and a current signal output configured to output a current control signal corresponding to the output current value.

In accordance with an aspect of the disclosure, a method of compensating for a torque of a motor may include: a torque information collection operation of collecting steering information, motor position information, and predetermined motor information; a torque ripple calculation operation of calculating a target torque based on the steering information and calculating a compensation torque for torque ripple based on the target torque and the motor information; a compensation current calculation operation of calculating a compensation current value based on the motor information and the compensation torque; a current value generation operation of converting the target torque into a target current value and generating an output current value based on the target current value and the compensation current value; and a current signal output operation of outputting a current control signal corresponding to the output current value.

Other specific details of the disclosure are included in the detailed description and drawings.

As described above, according to the disclosure, it is possible to improve the performance of an electric power steering (EPS) system and reduce the steering heterogeneity by reducing torque ripple, thereby providing convenience in driving.

Further, since a simple arithmetic processing method is used, it is possible to reduce the arithmetic processing cost for the torque ripple and have a high processing speed.

BRIEF DESCRIPTION OF THE DRAWINGS

The above and other aspects, features and advantages of the disclosure will be more apparent from the following detailed description taken in conjunction with the accompanying drawings, in which.

DETAILED DESCRIPTION OF THE EXEMPLARY EMBODIMENTS

Figure 1:
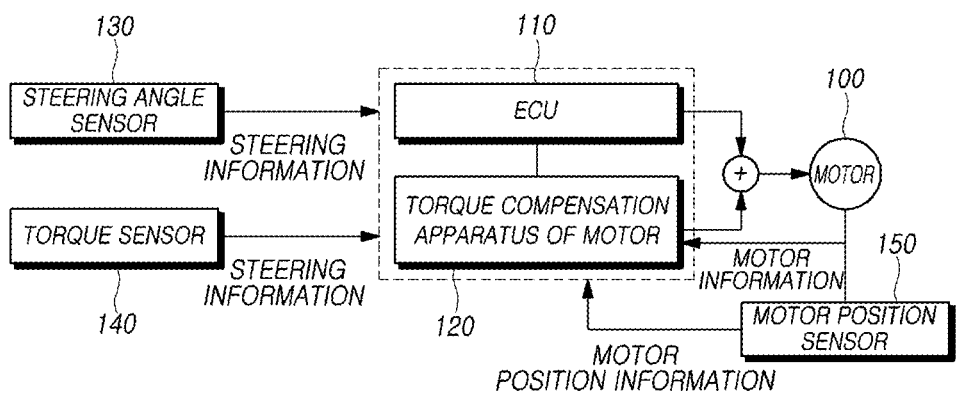
FIG. 1 shows an example of the configuration of an electric power steering (EPS) system according to an embodiment of the disclosure.

Hereinafter, exemplary embodiments of the present disclosure will be described in detail with reference to the accompanying drawings. The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Hereinafter, exemplary embodiments of the disclosure will be described with reference to the accompanying drawings.

FIG. 1 shows an example of the configuration of an electric power steering (EPS) system 1 according to an embodiment of the disclosure.

Referring to FIG. 1, the EPS system 1 according to an embodiment of the disclosure may include a motor 100 configured to provide steering assist power; an electronic control unit (ECU) 110 of the motor configured to control the driving and output of the motor 100; a torque compensation apparatus 120 of the motor configured to control the output of the motor so that torque ripple generated in the motor 100 is reduced; a steering angle sensor 130 and a torque sensor 140 configured to provide steering information according to a steering operation of a driver; and a motor position sensor 150 configured to sense a rotor position of the motor 100.

The EPS system 1 is shown briefly for the purpose of describing the disclosure, and the disclosure is not limited thereto.

Specifically, the torque compensation apparatus 120 of the motor or the ECU 110 of the motor may receive the steering information from either the steering angle sensor 130 or the torque sensor 140, may determine a target torque for steering targeted by the driver, and may convert the target torque into a target current value. A method of converting the target current value may be performed by the above-described torque compensation apparatus 120 of the motor or the ECU 110 of the motor, and may be a calculation method generally used in the art.

The torque compensation apparatus 120 of the motor may receive inherent information of the motor 100, that is, predetermined motor information and motor position information from the motor position sensor 150, and may determine a compensation torque lost by the torque ripple.

In addition, the torque compensation apparatus 120 of the motor may easily determine the compensation torque as a compensation current value through simple arithmetic processing, and may generate an output current value by adding the compensation current value to the target current value.

Thereafter, the torque compensation apparatus 120 of the motor may transmit a control signal corresponding to the output current value to the ECU 110 of the motor, and the ECU 110 of the motor may apply a current corresponding to the control signal to the motor 100. Next, the motor 100 may output a current in which the torque ripple is reduced.

As described above, the disclosure provides the torque compensation apparatus 120 of the motor that easily compensates for a torque by calculating a current value for torque ripple based on predetermined motor information and sensing information without adding a separate device.

Figure 2:
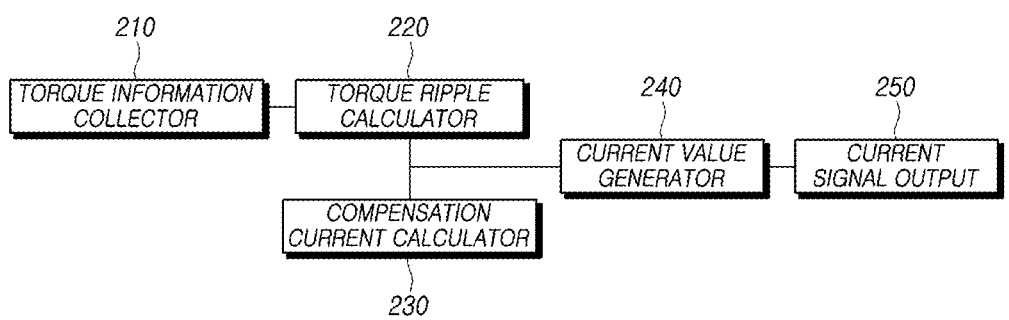
FIG. 2 is a block diagram showing an apparatus for compensating for a torque of a motor according to an embodiment of the disclosure.

FIG. 2 is a block diagram showing an apparatus for compensating for a torque of a motor according to an embodiment of the disclosure.

Referring to FIG. 2, a torque compensation apparatus 120 of the motor according to the disclosure may include: a torque information collector 210 configured to collect steering information, motor position information, and predetermined motor information; a torque ripple calculator 220 configured to calculate a target torque based on the steering information and to determine a compensation torque for torque ripple based on the target torque and the motor information; a compensation current calculator 230 configured to calculate a compensation current value based on the motor information and the compensation torque; a current value generator 240 configured to convert the target torque into a target current value and to generate an output current value based on the target current value and the compensation current value; and a current signal output 250 configured to output a current control signal corresponding to the output current value.

Specifically, the torque information collector 210 may collect necessary information from various sensors included in the EPS system 1.

That is, the steering information collected by the torque information collector 210 may be at least one of a torque signal output from the torque sensor 140 that senses the steering operation of a driver and a steering angle signal output from the steering angle sensor 130 that senses the steering operation. At this time, the torque sensor 140 may measure a steering torque of the driver input to a steering wheel, and the steering angle sensor 130 may measure the steering angle of the steering wheel.

The motor position information collected by the torque information collector 210 may be a motor position signal output from the motor position sensor 150 provided in the motor 100, and the motor information may include at least one of a torque constant, a torque ripple harmonic order, a phase of the torque ripple, and a torque ripple ratio (TRR).

At this time, the motor position information may be an electrical angle $\theta_r$ of the motor 100. The motor information may be an inherent characteristic of the motor 100 and may be determined experimentally or may be determined using a mechanical characteristic value. The motor information may be preset according to the motor 100.

That is, the rotation speed of the motor 100 is proportional to the magnitude of an applied voltage. At this time, the torque constant Ke[Nm] is a value indicating the degree of this proportion and has a different value depending on the current value.

The harmonic order H for the torque ripple is an order of harmonics where the torque ripple is generated, the phase $\theta_{ripple}$ of the torque ripple is a phase of the harmonics where the torque ripple is generated, and the TRR is a ratio at which the torque ripple is generated at the total output torque.

In an embodiment, the phase $\theta_{ripple}$ of the torque ripple and the TRR may be obtained through a simulation or bench testing of the motor 100.

In another embodiment, the phase $\theta_{ripple}$ of the torque ripple and the TRR may be determined based on a pre-stored map or lookup table. Accordingly, the phase of the torque ripple and the TRR may be determined based on the map or the lookup table according to the state of the motor, so that they can adaptively cope with the application environment or specification of the actual motor.

In still another embodiment, the phase $\theta_{ripple}$ of the torque ripple or the TRR may be determined as a value obtained by correcting a phase of a past torque ripple or a TRR based on the result of a compensation current value according to the phase of the past torque ripple or the TRR. Since a phase of a previous torque ripple or a TRR is corrected based on the motor torque compensation result using a compensation current value according to the phase of the previous torque ripple and/or the TRR, a more accurate compensation current value corresponding to the actual torque ripple can be determined.

Accordingly, the torque information collector 210 may include various sensors and various systems mounted on the host vehicle, or may receive information sensed by the various sensors and a traveling support system through a communication network in the vehicle.

In other words, the torque information collector 210 may include a wireless communication network including a mobile communication network such as integrated services digital network (ISDN), asymmetric digital subscriber line (ADSL), local area network (LAN), Ethernet, controller area network (CAN), TCP/IP-based communication network, optical communication network, CDMA, WCDMA, etc., as well as the Internet, and a local area communication network such as ZigBee or Bluetooth.

The torque ripple calculator 220 may determine the compensation torque lost by the torque ripple based on the information collected by the torque information collector 210.

The compensation torque $\tau_{ripple}$ can be determined by multiplying the target torque $\tau_{target}$ by the TRR, as shown in Equation 1 below.

$$\tau_{ripple} = \tau_{target} \times TRR \qquad \text{[Equation 1]}$$

In addition, the torque ripple calculator 220 may determine the target torque using the steering information, which may be a calculation method generally used in the art.

The compensation current calculator 230 may determine the compensation current value using the compensation torque determined by the torque ripple calculator 220.

That is, as shown in Equation 2 below, an amplitude A of the compensation current for the torque ripple can be determined by multiplying an inverse number of the torque constant $K_e$ by the compensation torque $\tau_{ripple}$.

$$A = \tau_{ripple}/K_e \qquad \text{[Equation 2]}$$

The compensation current value $I_{compensation}$ can be determined based on the amplitude A, the motor position information $\theta_r$, the harmonic order H, and the phase $\theta_{ripple}$, as shown in Equation 3 below.

$$I_{compensation} = A \sin(H \times \theta_r + \theta_{ripple}) \qquad \text{[Equation 3]}$$

The current value generator 240 may add the compensation current value $I_{compensation}$ determined by the compensation current calculator 230 to the converted target current value $I_{target}$, and generate the output current value $I_{output}$ in which the torque by the torque ripple is compensated.

The current signal output 250 may output and transmit a current control signal corresponding to the output current value generated by the current value generator 240, to the ECU 110 of the motor 100.

Then, the ECU 110, which is a motor control device, may apply a current according to the control signal to the motor 100, thereby realizing driving of the motor 100 in which the torque ripple is reduced.

As described above, the disclosure provides the apparatus for compensating for a torque by calculating a current value for torque ripple based on predetermined motor information and sensing information without adding a separate device.

In addition, the torque compensation apparatus 120 of the motor described above may implement a torque compensation logic of the motor by adding only the software without installing hardware.

Figure 3:
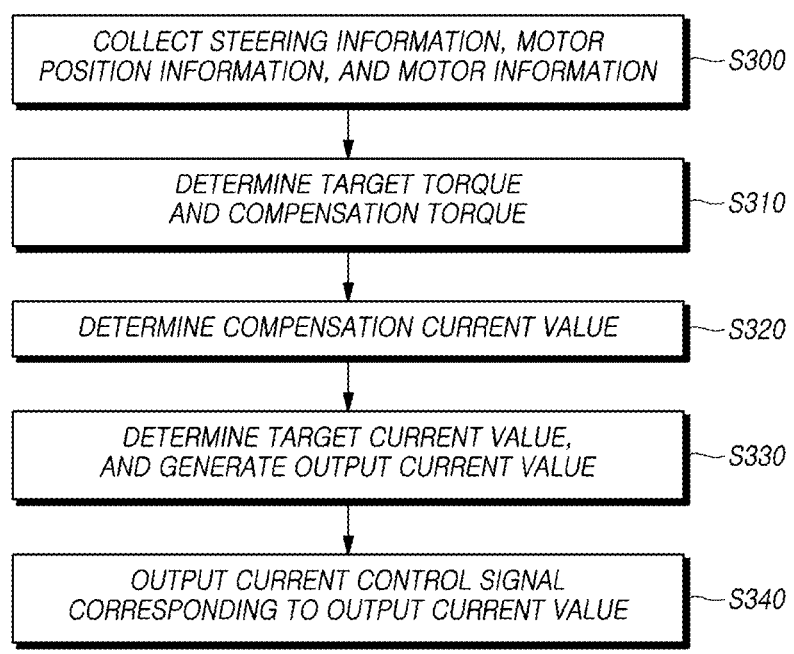
FIG. 3 is a flowchart showing a method of compensating for a torque of a motor according to an embodiment of the disclosure.

FIG. 3 is a flowchart showing a method of compensating for a torque of a motor according to an embodiment of the disclosure.

Referring to FIG. 3, a torque compensation method of the motor according to the disclosure may include: a torque information collection operation S300 of collecting steering information, motor position information, and predetermined motor information; a torque ripple calculation operation S310 of calculating a target torque based on the steering information and calculating a compensation torque for torque ripple based on the target torque and the motor information; a compensation current calculation operation S320 of calculating a compensation current value based on the motor information and the compensation torque; a current value generation operation S330 of converting the target torque into a target current value and generating an output current value based on the target current value and the compensation current value; and a current signal output operation S340 of outputting a current control signal corresponding to the output current value.

A detailed description of each operation will be made in FIG. 4.

Figure 4:
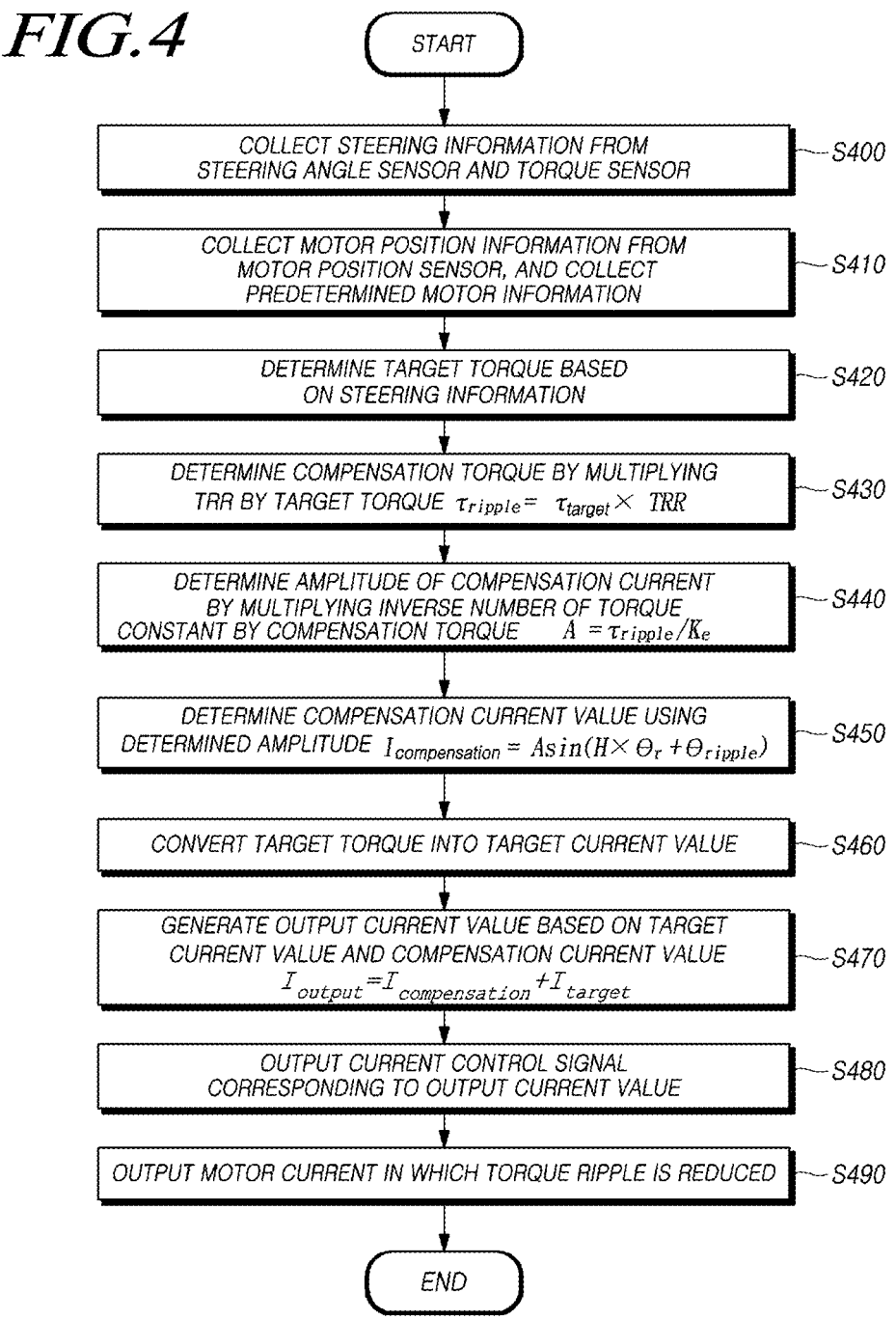
FIG. 4 is a flowchart showing a method of compensating for a torque of a motor according to an embodiment of the disclosure, in detail.

FIG. 4 is a flowchart showing a method of compensating for a torque of a motor according to an embodiment of the disclosure, in detail.

Referring to FIG. 4, in operation S400, the method collects steering information by a steering operation from a steering angle sensor or a torque sensor.

Here, the steering information may be at least one of a torque signal output from the torque sensor that senses the steering operation of a driver and a steering angle signal output from the steering angle sensor that senses the steering operation.

At the same time, in operation S410, the method collects motor position information from a motor position sensor and collects predetermined motor information.

Here, the motor position information may be a motor position signal output from the motor position sensor provided in the motor, and the motor information may include at least one of a torque constant, a torque ripple harmonic order, a phase of the torque ripple, and a TRR. That is, the motor information may be an inherent characteristic of the motor and may be determined experimentally or may be determined using a mechanical characteristic value. The motor information may be preset according to the motor.

The rotation speed of the motor 100 is proportional to the magnitude of an applied voltage. At this time, the torque constant Ke[Nm] is a value indicating the degree of this proportion and has a different value depending on the current value. The harmonic order H for the torque ripple is an order of harmonics where the torque ripple is generated, the phase $\theta_{ripple}$ of the torque ripple is a phase of the harmonics where the torque ripple is generated, and the TRR is a ratio at which the torque ripple is generated at the total output torque.

The phase $\theta_{ripple}$ of the torque ripple and the TRR may be set through, for example, a simulation or bench testing of the motor, determined based on a pre-stored map or lookup table, or determined as values obtained by correcting a phase of a past torque ripple or a TRR based on the result of a compensation current value according to the phase of the past torque ripple or the TRR.

Next, in operation S420, the method determines a target torque targeted by the driver at the time of steering operation based on the steering information.

At the same time, in operation S430, the method determines the compensation torque lost by the torque ripple based on the collected information. The calculation method is as shown in Equation 1 described above.

Next, in operation S440, the method determines an amplitude A of the compensation current for the torque ripple by multiplying an inverse number of the torque constant $K_e$ by the compensation torque $\tau_{ripple}$. The calculation method is as shown in Equation 2 described above.

Next, in operation S450, the method determines the compensation current value $I_{compensation}$ based on the amplitude A, the motor position information $\theta_r$, the harmonic order H, and the phase $\theta_{ripple}$. The calculation method is as shown in Equation 3 described above.

At the same time, in operation S460, the method converts the target torque into the target torque value $I_{target}$.

Next, in operation S470, the method adds the determined compensation current value $I_{compensation}$ to the converted target current value $I_{target}$, and generates the output current value $I_{output}$ in which the torque by the torque ripple is compensated.

Next, in operation S480, the method outputs a current control signal corresponding to the output current value to the ECU of the motor.

Next, in operation S490, the ECU outputs, to the motor, a current in which the torque ripple is reduced according to the control signal.

As described above, according to the apparatus and method of compensating for the torque of the motor according to the disclosure, it is possible to improve the performance of the EPS system and reduce the steering heterogeneity by reducing the torque ripple, thereby providing convenience in driving. Further, since a simple arithmetic processing method is used, it is possible to reduce the arithmetic processing cost for the torque ripple and have a high processing speed.

Although all the elements constituting embodiments of the present disclosure have been described above as being combined into a single device or combined to be operated as a single device, the present disclosure is not necessarily limited to these embodiments. That is, at least two elements of all structural elements may be selectively joined and operate without departing from the scope of the present disclosure. Further, all structural elements may be implemented in independent hardware respectively, but some or all of the structural elements may be selectively combined and implemented in computer programs which perform functions of some elements or all elements which are combined in one or more pieces of hardware. Codes and code segments constituting the computer program can be easily conceived by those skilled in the art to which the present disclosure pertains. Such a computer program may implement the embodiments of the present disclosure by being stored in a computer readable storage medium, and being read and executed by a computer. A storage medium for the computer program may include a magnetic recording medium, an optical recording medium, a carrier wave medium and the like.

Even if it was described above that all of the components of an embodiment of the present disclosure are coupled as a single device or coupled to be operated as a single device, the present disclosure is not necessarily limited to such an embodiment. That is, at least two elements of all structural elements may be selectively joined and operate without departing from the scope of the present disclosure.

The above embodiments of the present disclosure have been described only for illustrative purposes, and those skilled in the art will appreciate that various modifications and changes may be made thereto without departing from the scope and spirit of the disclosure. The scope of the present disclosure shall be construed based on the accompanying claims in such a manner that all of the technical ideas included within the scope equivalent to the claims belong to the present disclosure.

What is claimed is:

1. An apparatus for compensating for a torque of a motor, the apparatus comprising:
   a torque information collector configured to collect steering information, motor position information, and predetermined motor information;

a torque ripple calculator configured to determine a target torque based on the steering information and to determine a compensation torque for torque ripple based on the target torque and the motor information;

a compensation current calculator configured to determine a compensation current value based on the motor information and the compensation torque;

a current value generator configured to convert the target torque into a target current value and to generate an output current value based on the target current value and the compensation current value; and a current signal output configured to output a current control signal corresponding to the output current value, wherein the motor position information is a motor position signal output from a motor position sensor, and the motor information comprises at least one of a torque constant, a torque ripple harmonic order, a phase of the torque ripple, and a torque ripple ratio (TRR) of the torque ripple, and wherein the torque ripple calculator determines the compensation torque using the target torque and the TRR as factors.

2. The apparatus of claim 1, wherein the steering information is at least one of a torque signal output from a torque sensor for sensing a steering operation and a steering angle signal output from a steering angle sensor for sensing the steering operation.

3. The apparatus of claim 1, wherein the phase of the torque ripple or the TRR thereof is determined based on a pre-stored map or lookup table.

4. The apparatus of claim 1, wherein the phase of the torque ripple or the TRR thereof is determined as a value obtained by correcting a phase of a past torque ripple or a TRR based on the result of a compensation current value according to the phase of the past torque ripple or the TRR.

5. The apparatus of claim 1, wherein the compensation current calculator determines an amplitude of a compensation current for the torque ripple using the torque constant and the compensation torque as factors.

6. The apparatus of claim 5, wherein the compensation current calculator determines the compensation current value based on the amplitude, the motor position information, the harmonic order, and the phase.

7. The apparatus of claim 6, wherein the current value generator generates the output current value by adding the compensation current value to the target current value.

8. A method of compensating for a torque of a motor, the method comprising:

collecting steering information, motor position information, and predetermined motor information;

calculating a target torque based on the steering information and calculating a compensation torque for torque ripple based on the target torque and the motor information;

calculating a compensation current value based on the motor information and the compensation torque;

converting the target torque into a target current value and generating an output current value based on the target current value and the compensation current value; and outputting a current control signal corresponding to the output current value, wherein the motor position information is a motor position signal output from a motor position sensor, and the motor information comprises at least one of a torque constant, a torque ripple harmonic order, a phase of the torque ripple, and a torque ripple ratio (TRR) of the torque ripple, and wherein the calculating the target torque comprises calculating the compensation torque using the target torque and the TRR as factors.

9. The method of claim 8, wherein the calculating the compensation current value comprises calculating an amplitude of a compensation current for the torque ripple using the torque constant and the compensation torque as factors.

10. The method of claim 9, wherein the calculating the compensation current value comprises calculating the compensation current value based on the determined amplitude, the motor position information, the harmonic order, and the phase.

11. The method of claim 10, wherein the converting the target torque into the target current value and the generating the output current value comprises generating the output current value by adding the compensation current value to the target current value.

* * * * *